United States Patent Office 3,000,757
Patented Sept. 19, 1961

3,000,757
PROCESS FOR COATING SUBSTRATES WITH A VAPOR PERMEABLE POLYMERIC COATING
Robert Alexander Johnston, Cornwall on Hudson, and Ellsworth Kissam Holden and Ronald Albert Moltenbrey, Newburgh, N.Y., assignors to E. I. du Pont de Nemours and Company, Wilmington, Del., a corporation of Delaware
No Drawing. Filed Jan. 28, 1957, Ser. No. 636,481
10 Claims. (Cl. 117—63)

This invention relates to permeable polymeric coatings and more particularly to a process for making microporous polymeric coatings.

Vapor permeable polymeric coatings have become increasingly important in recent years, particularly for leather substitutes. Heretofore, vapor permeable leather substitutes have been prepared by applying polymeric coatings to suitable porous substrates, then mechanically piercing the coating on the substrates on a conventional textile needle loom. However, this procedure leaves visible holes in the coating. Other leather substitutes have been prepared from impregnated, unwoven fibrous batts; by preferential extraction of one component of a polymeric sheet or film; or by blowing pores in a polymeric sheet with a blowing agent. Few of these known procedures, however, yield products which have good tactile and tensile properties, yet are permeable and have no visible pores.

We have discovered a process for making microporous films and coatings which have excellent tactile and tensile properties and have no visible pores.

The process of this invention includes forming a polymeric solution having as essential constituents a hygroscopic solvent and a polymer formed by chain extending the reaction product of at least one polyalkyleneether glycol and at least one diisocyanate with at least one compound having two active hydrogen atoms, coating a substrate with the polymeric solution, exposing the coated substrate to an atmosphere characterized by having a relative humidity of about from 15 to 100% at a dry bulb temperature of about from 50° to 100° F. and removing the residual hydroscopic solvent from the resulting microporous coating. Although the concentration of polymer in the hygroscopic solvent can be up to 30% by weight, concentrations of from 5 to 20% by weight are preferred.

A simplified flow diagram of the process of this invention is:

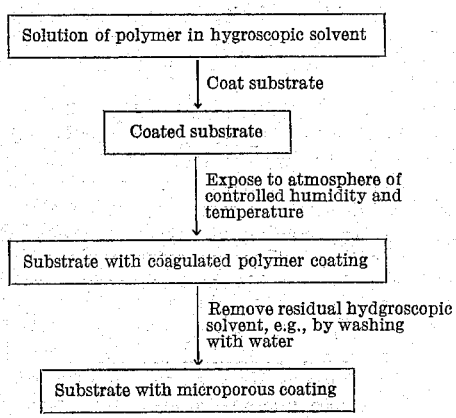

The polymers used in the microporous coating are prepared by chain extending a prepolymer having a molecular weight of from 750 to 10,000 and preferably from 800 to 3500 with a compound having two, and only two, active hydrogen atoms. The prepolymers are prepared by mixing one or more polyalkyleneether glycols with a molar excess of diisocyanate and heating the mixture to a temperature of about from 120° to 250° F. to form a polymer having terminal —NCO groups. An alternate procedure is to react the diisocyanate with a molar excess of polyalkyleneether glycol, then cap the resulting product, that is, react it with more diisocyanate to form a prepolymer having terminal —NCO groups. For example, polytetramethyleneether glycol having a molecular weight of about 1000 can be reacted with excess 4-methyl-m-phenylene diisocyanate to yield a prepolymer having —NCO end groups. Alternatively, the polytetramethyleneether glycol can be reacted with the 4-methyl-m-phenylene diisocyanate in a two-to-one mole ratio to provide a "dimer" with hydroxyl ends, then each mole of the resulting product can be reacted with two more moles of 4-methyl-m-phenylene diisocyanate or with another diisocyanate such as methylene bis(4-phenyl isocyanate) to produce a product with isocyanate end groups.

Polyalkyleneether glycols which can be used in the prepolymers include, for example, polyethyleneether glycol, polypropyleneether glycol, polytetramethyleneether glycol, polyhexamethyleneether glycol, polyoctamethyleneether glycol, polynonomethyleneether glycol, polydecamethyleneether glycol or mixtures thereof. Polyglycols containing several different radicals in the molecular chain, such as, for example, the compound $$HO(CH_2OC_2H_4O)_nH$$

wherein $n$ is an integer greater than 1, can also be used.

Aromatic, aliphatic, cycloaliphatic diisocyanates or combinations thereof can be used in forming the prepolymers. They include, for example, 4-methlyl-m-phenylene diisocyanate, m-phenylene diisocyanate, 4,4'-biphenylene diisocyanate, methylene bis(4-phenyl isocyanate), 4-chloro-1,3-phenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis(cyclohexylene isocyanate) and 1,5-tetrahydronaphthalene diisocyanate. Arylene diisocyanates, that is, those in which the isocyanate groups are attached to the aromatic ring, are preferred. In general, they react more rapidly than do the alkylene diisocyanates.

The prepolymer of the polyalkyleneether glycol and diisocyanate is next chain-extended with a compound having two active hydrogen atoms, thereby joining several prepolymer molecules together to form a substantially linear polymer. One or more chain-extending compounds can be added directly to the prepolymer. Alternatively, segmented polymers can be formed by reacting a prepolymer having terminal —NCO groups with the chain extending agent plus more diisocyanate. The polymer thus formed consists of large prepolymer segments linked together with the chain extending agent and smaller segments consisting of the reaction product of the chain extending agent and the excess diisocyanate.

Another alternative method of chain extending is to divide the prepolymer into two portions, then partially react each portion with a different chain-extending agent. Finally, the two resulting portions are combined and the chain extension is completed with more chain-extending agent.

The prepolymer is chain extended with at least one compound having two, and only two functional groups bearing active hydrogen, such as, for example, water, hydrazine, diamines, amino alcohols, amino acids, hydroxy acids, glycols or mixtures thereof. Such chain-extending agents include, for example, hydrazine, water, dimethyl piperazine, ethylene glycol, 2-amino ethanol, 4-methyl-m- phenylene diamine, m-phenylene diamine, 4,4′-diamino diphenyl methane, 3,3′-dichlorobenzidine and m-aminobenzoic acid. Hydrazine, water and dimethyl piperazine are the preferred chain-extending agents. Water reacts with a —NCO group to form an amino group and liberates carbon dioxide. The resulting amino group reacts with another —NCO group to join two prepolymer molecules. Thus, water functions as if it had two active hydrogen atoms.

The chain-extension reactions are usually carried out at temperatures below 250° F. and often, particularly for hydrazine-extended polymers, at about room temperature. The chain-extension reactions can be carried out without a solvent in heavy duty mixing equipment or they can be carried out in homogenous solutions. When the reaction is carried out in solution, for convenience, one of the hygroscopic materials which are employed in forming the microporous coatings can be used as a solvent. The chain extension process just described usually yields a substantially linear polymer having a molecular weight of approximately from 25,000 to 300,000.

A great number of different polymers can be prepared from the materials and by the processes just described. The polymers themselves and the procedures by which they are made are not part of this invention. They are described in more detail in British Patent No. 731,071, Italian Patent No. 523,505, U.S. Patent No. 2,692,873 and pending application Serial No. 556,071, now Patent No. 2,957,852, filed December 29, 1955, by Frankenburg and Frazier.

To form microporous coatings, the chain extended polyalkyleneether glycol diisocyanate polymer is first dissolved in a hygroscopic solvent such as, for example, N,N′-dimethyl formamide, dimethyl sulfoxide, tetrahydrofuran, tetramethyl urea, N,N′-dimethylacetamide or mixtures of acetone and N,N′-dimethyl formamide.

The particular hygroscopic solvent which is used to deposit the microporous coating depends somewhat upon the chain-extending agent which is reacted with the prepolymer. If the prepolymer is chain extended in solution, then applied directly, the solvent should not hinder the chain-extension reaction. In addition, once the chain-extended prepolymer is deposited onto the substrate, it should not be readily resoluble in the solvent. N,N′-dimethyl formamide and mixtures thereof with such solvents as, for example, acetone, are particularly preferred since they meet these requirements when they are used with a wide variety of chain-extended prepolymers.

Vinyl polymers such as, for example, polyvinyl chloride, polymethyl methacrylate, polyvinyl butyral, polyacrylonitrile and copolymers thereof can also be dissolved with the chain-extended polymers in the aforementioned solvents. These vinyl polymers alone do not form strong, flexible microporous coatings; however, mixtures of the chain-extended prepolymers used in this invention and the vinyl polymers can be formed into such coatings. Polymer mixtures containing 50% or less of vinyl polymer are preferred. Small amounts of fillers, pigments, dyes, lakes and toners can also be added to the polymer solution.

The polymer solution is next coated onto a substrate, which, for most leather substitutes is preferably a porous, fibrous substrate. The solution can be coated by any conventional fluid coating technique, such as, for example, spray coating, knife coating, roller coating, casting or brushing. Thin coatings, less than about 15 mils thick, are preferably applied by spraying. Thick microporous coatings are conveniently applied by one-pass knife coating.

Typical examples of the fibrous substrates to which the polymeric solutions are applied include woven twills, drills and ducks; jersey, tricot and simplex knitted materials; and felts; needle-punched batts, and batts impregnated with synthetic resins such as rubber and vinyl halide polymers. The choice of the particular fibers from which the substrate is made is not critical; they include, for example, those made from polyamides, polyesters, polyesteramides, viscose rayon, wool, cotton, glass and mixtures thereof.

Microporous films are prepared by coating the polymeric solution onto an impervious substrate of, for example, glass or stainless steel, then stripping the microporous coating formed therefrom from the substrate.

After the solution of chain extended polyalkylene-ether glycol diisocyanate polymer has been applied to a substrate, the coated substrate is exposed to an atmosphere containing water vapor. The hygroscopic solvent in the coating absorbs the water vapor thereby coagulating the polymer and depositing a microporous coating of the polymer onto the substrate. Broadly, this atmosphere can be characterized by having a relative humidity ranging from about 15 to 100% at a dry bulb temperature ranging from 50° to 100° F. The particular humidity conditions which are used depend to a great extent upon the method by which the polymeric solution is applied to the substrate; however, generally the required relative humidity increases with the thickness of the solution coating and the absorptivity of the substrate. Lower relative humidities can be used at high dry bulb temperatures and when the atmosphere containing the water vapor is circulated over the coated surface or drawn through it by applying a vacuum to the substrate. Spraying liquid water onto the solution coating gives the coating a rough surface with large pores. If a substrate coated with the polymeric solution is dipped into water, the resulting polymeric coating is often impermeable.

One preferred method of forming microporous coatings on porous substrates is to spray several thin layers, usually less than two mils thick, of polymeric solution onto the substrate. Between each spraying, the coating of polymeric solution is exposed to an atmosphere characterized by having a relative humidity of from 20 to 35% and a dry bulb temperature of from 70° to 90° F. The exposure time between each spraying is preferably from 30 to 300 seconds.

Thick microporous coatings, for example, those up to about 40 mils thick, are preferably applied in one pass by knife coating, roller coating or casting. For this procedure the polmeric solution coating is preferably exposed to an atmosphere having a relative humidity of 50 to 95% at a dry bulb temperature of approximately 50° to 90° F. When the polymeric solution is applied in one pass, it is exposed to water vapor until the microporous structure is completely formed; the exposure time in this method is not as critical as when several successive layers of solution are applied to build up a microporous coating.

The final step in the process is to remove the residual hygroscopic solvent from the completely formed microporous structure. Preferably, the microporous coating is washed with water to remove the hygroscopic solvent, then dried. Alternatively, however, the residual solvent can be removed from the microporous coating without washing, by air drying the coating at room or elevated temperature.

Leather substitutes formed by depositing the microporous polymeric coating of this invention onto a fibrous substrate by the process just described are preferably buffed and top dressed to enhance their hand and appearance. Buffing also removes any irregularities in the surface of the coating and gives it a better texture. Standard leather buffing apparatus, equipped with silica-, emery-, aluminum oxide- or Carborundum-coated paper, is conveniently used for this buffing step. Suitable top dressings include, for example, conventional shoe and boot polishes, and pigmented mixtures of various polymeric latices such as, for example, mixtures of butadiene-acrylonitrile copolymers with phenol-formaldehyde resins.

The process of this invention makes it possible to deposit strong, flexible, and permeable leather-like coatings which have no visible pores. Leather substitutes prepared by depositing these coatings on fibrous substrates make excellent replacements for natural leather in upholstery, baggage, handbags, gloves, boots, shoe-uppers and clothing. Products varying from soft artificial suede and chamois to tough scuff-resistant shoe leather substitutes can be made by this process.

The following examples are intended to illustrate the invention and not to limit it in any way. Parts are by weight unless otherwise specified.

Example I

A polyurea is prepared by reacting 2000 grams (about 2 gram moles) of polytetramethyleneether glycol having a molecular weight of about 967 with 1032 grams (about 4 gram moles) of methylene bis(4-phenyl isocyanate) for 1¼ hours on a steam bath. The resulting "capped monomer" with isocyanate ends is dissolved in 3 liters of dimethyl formamide and reacted at about room temperature with 99 grams of hydrazine hydrate dissolved in 14.9 liters of dimethyl formamide. The resulting chain-extended polymeric solution contains 15% solids and has a viscosity of about 30 poises at room temperature.

A coating composition is prepared by diluting the polymer solution just described to a solids concentration of 6.34% by weight with more dimethyl formamide, then adding 0.3 part of Hoover Brown Pigment to 100 parts of the diluted solution. The resulting coating composition is sprayed in about 8 passes onto a pressed, knitted, nylon fabric. Between each spraying, the polymeric solution coating is exposed for about 30 seconds to an atmosphere having a dry bulb temperature of 89° F. and a relative humidity of 30%. Finally the coated fabric is washed with water to remove the residual dimethyl formamide.

The resulting microporous coating weighs about 2 ounces per square yard and has satisfactory edge-wear, scrub and abrasion resistance and flex life. The leather substitute has a water vapor permeability value (often referred to as LPV or leather permeability value) of about 5000 grams per hour per 100 square meters determined by the test described by Kanagy and Vickers in the Journal of American Leather Chemists Association, 45, 211–242 (April 19, 1950). An LPV of over 1500 grams per hour per 100 square meters is preferred for shoe uppers.

If N,N'-dimethylacetamide is used instead of N,N'-dimethylformamide, a product having substantially the same properties is obtained.

Example II

Example I is repeated; however, between each spraying the coated fabric is exposed to an atmosphere having a relative humidity of 25% at a dry bulb temperature of 85° F. for from 30 seconds for the first coat to 150 seconds for the last coat. The resulting product has excellent edge-wear, scrub and abrasion resistance and excellent permeability and flex life.

Example III

Three chain-extended polymers are prepared from polytetramethyleneether glycol, methylene bis(4-phenyl isocyanate) and hydrazine hydrate as described in Example I; however, polytetramethyleneether glycols having molecular weights of 460, 700 and 2000 instead of 967 are used. A microporous coating of each of the chain-extended polymers is applied to knitted nylon fabric under the conditions shown in Example II. The resulting products have properties comparable to those of the microporous coatings formed from the polytetramethyleneether glycol having a molecular weight of 967.

Example IV

Example I is repeated. After each spraying the coated fabric is exposed to an atmosphere having a relative humidity of 40% and a dry bulb temperature of 80° F. for from 30 seconds for the first coat to 150 seconds for the last coat. The resulting product has properties intermediate between those of the microporous coatings in Examples I and II.

Example V

A polyurea is prepared by heating about 28 gram moles of polytetramethyleneether glycol having a molecular weight of about 1000 with about 14 gram moles of 4-methyl-m-phenylene diisocyanate at about 212° F. for 3 hours. The resulting "dimer" with hydroxyl ends is reacted with about 14.5 gram moles of methylene bis(4-phenyl isocyanate) at 212° F. for 1 hour to form a capped prepolymer. Next, the prepolymer is dissolved in about 14 liters of dimethyl formamide and chain extended at room temperature with about 0.55 gram moles of hydrazine hydrate dissolved in about 0.55 liter of dimethyl formamide. The resulting chain-extended polymer solution contains about 22% solids and has a viscosity of about 400 poises at 30° F.

An impregnating and coating solution is formed by adding pigment and solvent to the solution described above. The resulting solution has the following composition.

| | Parts by weight |
|---|---|
| Polyurea | 303 |
| Channel black | 1 |
| Cadmium-red pigment | 11 |
| Dimethyl formamide | 3185 |
| | 3500 |

Weight percent polyurea = 8.7.

A needle-punched, heat-shrunk batt of polyethylene terephthalate fibers is run through the solution just described at the rate of about 6 yards per minute, then immersed in cold water for about 6 minutes. The resulting substrate is dried and buffed.

A mircoporous coating is deposited on the impregnated substrate by knife coating a 20-mil film of the aforementioned polyurea solution onto the substrate, then exposing the solution to an atmosphere having a relative humidity of about 75% at a dry bulb temperature of about 80° F. After the microporous coating has completely set, it is washed with water and air dried. A light coat of brown "Esquire" boot polish is spread onto the resulting microporous surface to enhance its leather-like appearance. This product has an LPV of about 5000 grams per hour per 100 square meters.

Example VI

A carded, needle-punched and heat shrunk batt of polyethylene terephthalate fibers is impregnated with a 12 weight percent solution of polyurea in dimethyl formamide. The polyurea impregnant is formed by reacting 200 parts of polytetramethyleneether glycol having a molecular weight of 1000 with 23.3 parts of 4-methyl-m-phenylene diisocyanate for 3 hours at 212° F. to form a prepolymer having an average molecular weight of about 3350. The mass is cooled to 155°–165° F. and reacted with 0.38 part of water and 26.5 parts of 4-methyl-m-phenylene diisocyanate for 2 hours. Finally the chain extension of the prepolymer is completed by adding 8.4 more parts of water and holding the reaction mass at about 208° F. for about 21 minutes. The resulting product is stabilized with 1.5 parts of piperidine and dissolved in dimethyl formamide.

The fibrous substrate is finished by dipping the impregnated batt in water, then drying and hot-pressing it at about 270° F.

The substrate is next spray coated in about 8 passes with a pigmented dimethyl formamide solution containing approximately 7% by weight of a polyurea similar to that shown in Example V. Between each spraying the solution coating is exposed to an atmosphere having a relative humidity of about 70% and a dry bulb temperature of about 80° F. Finally the coated substrate is heated to about 275° F. for about 2 hours to remove residual solvent.

The resulting product which has a microporous coating about 14 mils thick has a water vapor permeability of about 4000 grams per hour per 100 square meters and a Schildtknecht flex life of about 1.3 million flexes determined with the apparatus described in Bulletin No. 105 published by Alfred Suter, 200 Fifth Avenue, New York, N.Y.

Because of the high relative humidity used in this example, the microporous coating sometimes cracks or has some visible pores. For spray coating, a better product is obtained if a relative humidity of about 30% is used.

If the procedure just described is repeated using the impregnating solution for the coating solution also, a product having essentially the same properties as those shown above is obtained.

Example VII

Thirty parts of a solution containing 10 weight percent of a polyurea similar to that described in Example V dissolved in dimethyl formamide is mixed with 60 parts of a 5% dimethyl formamide solution of polyvinyl chloride ("Geon" 121—B. F. Goodrich Chemical Co.) A 30-mil film of the resulting solution is knife coated onto a glass plate, then exposed to an atmosphere having a relative humidity of about 50% and a dry bulb temperature of about 85° F. for 2 hours. The mircoporous film is then washed in water, dried and stripped from the glass plate. The resulting microporous film has a thickness of about 4 mils and a LPV of about 22,000 grams per hour per 100 square meters.

Instead of depositing the polyurea solution on a glass plate, it can be knife coated onto a porous fabric, thereby yielding a porous leather substitute.

Example VIII

A prepolymer of polytetramethyleneether glycol and methylene bis(4-phenyl isocyanate) is prepared by the procedure shown in Example I. Approximately 1 mole of methylene bis(4-phenyl isocyanate) dissolved in dimethyl formamide is added to each mole of prepolymer and the resulting mixture is heated for about 1 hour at 212° F. Finally, the prepolymer is chain extended by adding approximately 2 moles of dimethyl piperazine dissolved in dimethyl formamide to every mole of prepolymer and holding the resulting mixture at about 30°–40° F. until the chain extension is completed. The resulting polymeric solution has a viscosity of about 400 poises at 30° F. and about 17% solids.

A dimethyl formamide solution containing 2.5% by weight of the polyurea described above and 2.5% by weight of the polyurea described in Example V is sprayed on an impregnated batt similar to that described in Example VI. Between each spraying, the solution coating is exposed to an atmosphere having a relative humidity of about 35% at a dry bulb temperature of about 85° F. for about from 1 to 2 minutes. After about 8 sprayings, the coated substrate is washed in water, then dried. The resulting product has high permeability and is useful for clothing, shoes, handbags and other leather-like products.

We claim:

1. A process which comprises forming a polymeric solution having as essential constituents a hygroscopic solvent and up to 30 percent by weight of a polymer formed by chain-extending the reaction product of at least one polyalkyleneether glycol and at least one diisocyanate with at least one compound having two active hydrogen atoms, coating a substrate with said polymeric solution, exposing said coated substrate to an atmosphere characterized by having a relative humidity of about from 15 to 100% at a dry bulb temperature of about from 50° to 100° F. and removing residual hygroscopic solvent from the resulting microporous coating.

2. A process which comprises forming a polymeric solution having as essential constituents dimethyl formamide and up to 30 percent by weight of a polyurea formed by chain-extending the reaction product of at least one polyalkyleneether glycol and at least one diisocyanate with at least one compound having two active hydrogen atoms, coating a substrate with said polymeric solution, exposing said coated substrate to an atmosphere characterized by having a relative humidity of about from 15 to 100% at a dry bulb temperature of about from 50° to 100° F. and removing residual hygroscopic solvent from the resulting microporous coating.

3. A process which comprises forming a polymeric solution having as essential constituents a hygroscopic solvent and up to 30 percent by weight of a polymer component consisting of a vinyl polymer and a polymer formed by chain-extending the reaction product of at least one polyalkyleneether glycol and at least one diisocyanate with at least one compound having two active hydrogen atoms, coating a substrate with said polymeric solution, exposing said coated substrate to an atmosphere characterized by having a relative humidity of about from 15 to 100% at a dry bulb temperature of about from 50° to 100° F. and removing the residual hygroscopic solvent from the resulting microporous coating.

4. A process which comprises forming a polymeric solution having as essential constituents a hygroscopic solvent and about from 5 to 20 percent by weight of a polymer formed by chain-extending the reaction product of at least one polyalkyleneether glycol and at least one diisocyanate with at least one compound having two active hydrogen atoms, coating a substrate with said polymeric solution, exposing said coated substrate to an atmosphere characterized by having a relative humidity of about from 15 to 100% at a dry bulb temperature of about from 50° to 100° F. and removing the residual hygroscopic solvent from the resulting microporous coating.

5. A process which comprises forming a polymeric solution having as essential constituents a hygroscopic solvent and about from 5 to 20 percent by weight of a polymer formed by chain extending the reaction product of at least one polyalkyleneether glycol and at least one diisocyanate with at least one compound having two active hydrogen atoms, spraying a plurality of coats of said polymeric solution onto a porous fibrous substrate, after each of said spray coats is applied exposing said coated substrate to an atmosphere characterized by having a relative humidity from 20 to 35% at a dry bulb temperature of from 70° to 90° F. for about 30 to 300 seconds and washing the resulting microporous coating with water to remove the residual hygroscopic solvent.

6. A process which comprises forming a polymeric solution having as essential constituents a hygroscopic solvent and about from 5 to 20 percent by weight of a polymer formed by chain-extending the reaction product of at least one polyalkyleneether glycol and at least one diisocyanate with at least one compound having two active hydrogen atoms, knife coating a porous fibrous substrate with said polymeric solution, exposing said coated substrate to an atmosphere characterized by having a relative humidity of from 50 to 95 percent at a dry bulb temperature of from 50° to 90° F. and washing the resulting microporous coating with water to remove the residual hygroscopic solvent.

7. A leather-substitute comprising a porous, fibrous substrate and, in adherent contact therewith, a vapor-permeable, microporous, polymeric coating substantially free of visible pores, the polymer in said coating comprising the reaction product of at least one polyalkyleneether glycol and at least one diisocyanate chain-extended with at least one compound having two active hydrogen atoms.

8. A product of claim 7 wherein said polymer in said coating is chain extended with hydrazine.

9. A product of claim 7 wherein said polymer in said coating comprises a mixture of vinyl polymer and at least about 50% by weight of said chain-extended reaction product.

10. A leather-like product of claim 9 wherein said polymer in said coating comprises a mixture of a vinyl chloride polymer and at least about 50% by weight of the reaction product of polytetramethyleneether glycol having a molecular weight of about from 460 to 2000 and at least one arylene diisocyanate, said reaction product being chain extended with chain extender comprising hydrazine.

References Cited in the file of this patent

UNITED STATES PATENTS

| | | |
|---|---|---|
| 2,692,874 | Langerak | Oct. 26, 1954 |
| 2,721,811 | Dacey et al. | Oct. 25, 1955 |
| 2,826,509 | Sarbach | Mar. 11, 1958 |
| 2,837,770 | Heirmann et al. | June 10, 1958 |
| 2,848,752 | Bechtold | Aug. 26, 1958 |
| 2,930,106 | Wrotnowski | Mar. 29, 1960 |

FOREIGN PATENTS

| | | |
|---|---|---|
| 727,321 | Great Britain | Mar. 30, 1955 |